Jan. 15, 1957     F. E. MEFFORD     2,777,183
GARTER GRIPS
Filed Jan. 21, 1955
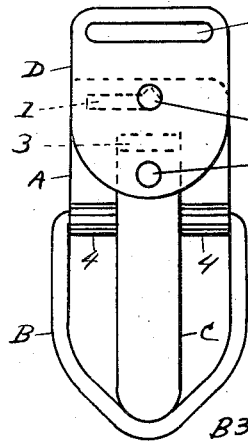
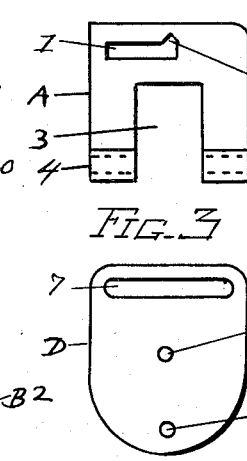
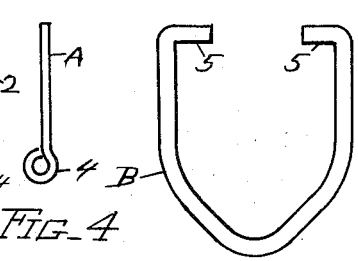
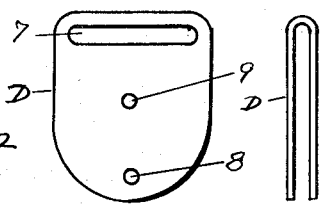
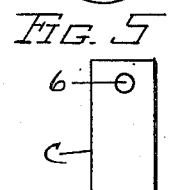
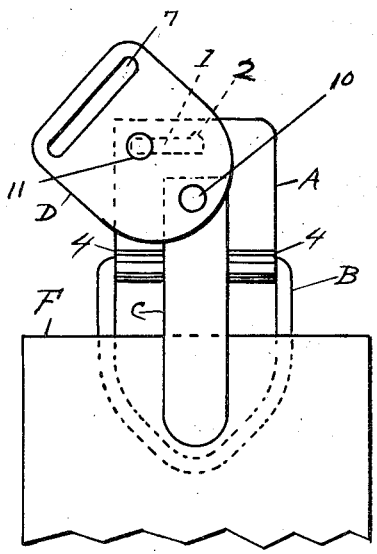
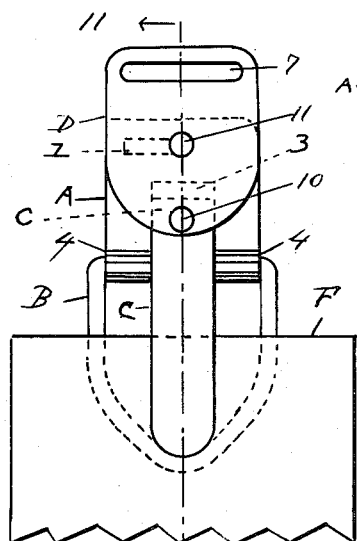
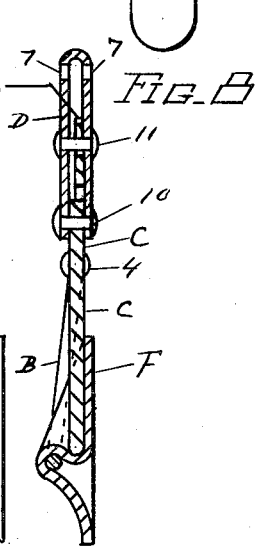
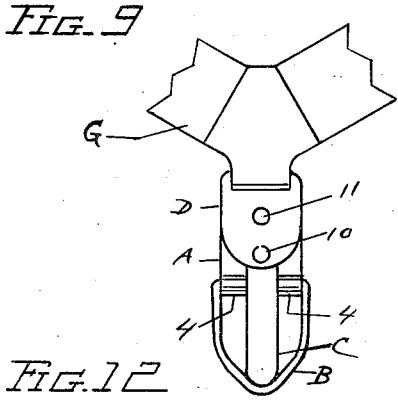
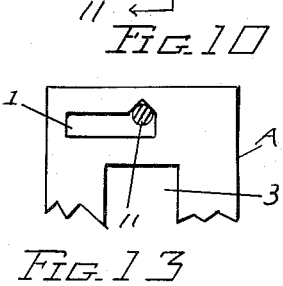
Inventor
Fred E. Mefford

United States Patent Office 2,777,183
Patented Jan. 15, 1957

2,777,183

GARTER GRIPS

Fred E. Mefford, Pittsburgh, Pa.

Application January 21, 1955, Serial No. 483,237

3 Claims. (Cl. 24—263)

My invention relates to garter and hose supporter grips.

My object in general is to provide a device in this class that is substantially flat when gripped to a fabric such as socks, women's hose and other fabric articles. Another object is to provide means in said device to maintain a substantially flat member in coplanar relation with a substantially flat plate and to move said flat member longitudinally in a straight line.

The drawings illustrate one embodiment of my invention, in which Figure 1 represents a front view of an assembled grip; Fig. 2, a side view of Fig. 1; Fig. 3, a front view of the plate A; Fig. 4, a side view of Fig. 3; Fig. 5, a front view of the wire loop; Fig. 6, a front view of the operating member; Fig. 7, a side view of Fig. 6; Fig. 8, a front view of the tongue; Fig. 9, a front view showing the relative positions of the members and fabric F at one stage of operating the grip; Fig. 10, a front view showing the grip and fabric F in normal relation; Fig. 11, a vertical sectional view on the line 11—11 in Fig. 10; Fig. 12, a reduced front view of a fragment of a garter including my grip; Fig. 13, an enlarged fragmentary front view of the plate A, and the pin 11 in section; and Fig. 14, a front view of an alternative loop B4.

In the drawings I have shown the preferred embodiment of the invention but do not thereby limit myself to the precise forms shown and wish it understood that various modifications may be made within the scope of what hereinafter is claimed, without departing from the spirit of the invention.

The grip illustrated comprises a plate A, a loop B, a tongue C, and an operating member D. The plate A is substantially flat and is provided with a slotted lateral guideway 1 in the upper end portion, a notch 2 located substantially in the longitudinal medial line of the plate A and communicating with the upper side of the lateral guideway 1, a slotted longitudinal guideway 3 along said longitudinal medial line, and a pair of substantially concentric bearings 4—4 on the lower end portion. The loop B is made of wire and provided with a pair of concentric lateral projections 5—5 which are swivelled in the bearings 4—4. The tongue C is substantially flat and is provided with a perforation 6 in the upper end portion. The operating member D is substantially a yoke and is provided with a lateral slot 7 in the upper end portion, and a pair of perforations 8—9 located substantially along the longitudinal medial line of the yoke.

In assembling, the lateral projections 5—5 of the loop B are swivelled in the bearings 4—4, the tongue C is slidably disposed in the longitudinal guideway 3, the operating member D is disposed astride the plate A and tongue C, a pin 10 is run through the perforations 8—8 in the operating member D and the perforation 6 in the tongue C so as to connect the tongue C to the operating member D. A pin 11 is run through the perforations 9—9 in the operating member D and through the lateral guideway 1. The pins are riveted or otherwise secured against accidental removal.

The operating member D is a yoke and each side contains the perforations 8 and 9 through which the pins 10 and 11, respectively, are run.

The longitudinal guideway 3 permits the tongue C to be disposed in coplanar relation with the plate A and guides the tongue C longitudinally in a straight line. The lateral guideway 1 permits the pin 11 to travel laterally while the tongue C travels longitudinally in the plate A. The two guideways permit the member D to be swung edgewise to move the tongue longitudinally.

The device is gripped to a fabric in the following manner: The operating member D is swung sidewise out of alignment with the longitudinal medial line of the plate A. This action causes the pin 11 to move along the lateral guideway 1, and the tongue C to move upward within the longitudinal guideway 3 and thereby space the lower end of the tongue C from the lower end portion of the loop B. The loop B is swung rearward to the position indicated by the dotted position B-2 in Fig. 2. A fabric F is disposed between the tongue C and the loop B as shown in Fig. 9, and the loop B is swung forward as indicated by the dotted position B-3 in Fig. 2. This action causes a portion of the fabric F to be drawn forward beyond the end portion of the tongue C. While holding the tongue, loop and fabric in the relative positions described, the operating member D is swung back to normal alignment with the plate A. As will be seen by reference to Fig. 11, the thickness of the fabric F added to the length of the tongue C, provides a flat button effect which prevents the loop and fabric from moving to the rear of the tongue. To release the grip, the operating member D is swung sidewise and out of alignment with the plate A as previously described and thereby permits the grip to be slipped from the fabric.

When the device is normally gripped to a fabric as shown in Figs. 10-11, the pin 11 is engaged by the notch 2. This engagement affords resistance to sidewise swinging of the operating member D. The notch should be deep enough to afford sufficient resistance to prevent accidental movement of the operating member D but not great enough to prevent manual swinging.

I claim:

1. In a garter grip, the combination of a substantially flat base plate; a substantially flat tongue; and means to maintain said tongue in coplanar relation with said base plate, and to move said tongue longitudinally in a substantially straight line; said means including a longitudinal guideway in said base plate, the upper portion of said tongue being slidably disposed in said longitudinal guideway, a lateral guideway in said base plate, a yoke disposed astride said base plate, a pin connecting said yoke to said tongue, and a fulcrum pin located in said yoke and extending through said lateral guideway and adapted to travel therein to permit said yoke to be swung edgewise to slide said tongue along said longitudinal guideway.

2. A garter grip including a substantially flat base plate; a pair of concentric lateral bearings on said base plate; a loop provided with lateral projections which are swivelled in said bearings; a substantially flat tongue adapted to cooperate with said loop to grip fabric; and means to maintain said tongue in coplanar relation with said base plate and to move said tongue longitudinally in a substantially straight line; said means including a longitudinal guideway in said base plate to guide said tongue in a substantially straight line, the upper portion of said tongue being disposed in said longitudinal guideway, a lateral guideway in said base plate, a yoke disposed astride said base plate, a pin connecting said yoke to said tongue, and a fulcrum pin located in said yoke and extending through said lateral guideway and adapted to travel therein to permit said yoke to be swung edgewise to slide said tongue in said longitudinal guideway.

3. A garter grip including a substantially flat base plate; a pair of concentric bearings on said base plate; a loop provided with a pair of concentric lateral projections which are swivelled in said bearings; a substantially flat tongue to cooperate with said loop to grip fabric; and means to operate said tongue, said means including a longitudinal guideway along the longitudinal medial line in said base plate; the upper end portion of said tongue being slidably disposed in said longitudinal guideway, a lateral guideway extending at right angles from said longitudinal medial line in the upper portion of said base plate, a yoke disposed astride said base plate, a pin connecting said yoke to said tongue, and a pin located in said yoke and extending through said lateral guideway and adapted to travel therein to permit said yoke to be swung edgewise to move said tongue along said longitudinal guideway in a substantially straight line; and means to resist accidental swinging of said yoke, said means including a notch in the upper side of said lateral guideway to engage said fulcrum pin when said yoke is in normal alignment with said plate.

References Cited in the file of this patent

UNITED STATES PATENTS

| | | |
|---|---|---|
| 249,032 | Ford | Nov. 1, 1881 |
| 342,638 | Ross | May 25, 1886 |
| 413,772 | Arnold | Oct. 29, 1889 |
| 2,118,475 | Pallas | May 24, 1938 |
| 2,167,167 | Benkert | July 25, 1939 |

FOREIGN PATENTS

| | | |
|---|---|---|
| 721,664 | Germany | of 1942 |
| 13,029 | Great Britain | of 1909 |